United States Patent [19]

Matsuo et al.

[11] Patent Number: 5,091,788
[45] Date of Patent: Feb. 25, 1992

[54] CROSSTALK CANCELLING CIRCUIT FOR REMOVING CROSSTALK COMPONENT FROM REPRODUCED SIGNAL

[75] Inventors: Yasutoshi Matsuo, Kawasaki; Ryo Nakano, Yokohama, both of Japan

[73] Assignee: Victor Company of Japan, Ltd., Japan

[21] Appl. No.: 417,402

[22] Filed: Oct. 5, 1989

[30] Foreign Application Priority Data

Oct. 6, 1988 [JP] Japan .................. 63-130431[U]

[51] Int. Cl.[5] .................. H04N 9/79; H04N 9/88
[52] U.S. Cl. .................. 358/328; 358/310; 358/340
[58] Field of Search ............ 358/328, 327, 326, 310, 358/340, 329; 360/38.1

[56] References Cited

U.S. PATENT DOCUMENTS

4,807,048 2/1990 Yasuda .................. 358/310
4,969,033 11/1990 Yamada et al. .................. 358/328

Primary Examiner—Roy N. Envall, Jr.
Assistant Examiner—Huy Nguyen
Attorney, Agent, or Firm—Lowe, Price, LeBlanc & Becker

[57] ABSTRACT

A crosstalk cancelling circuit for use in video tape recorders. The cancelling circuit comprises a first multiplier for multiplying a frequency-lowered conversion chrominance signal reproduced from a magnetic tape by a local oscillating signal with a predetermined frequency and a delay device for delaying the frequency-lowered conversion chrominance signal by one horizontal scanning period. The local oscillating signal is further supplied to a phase-shifting circuit which in turn produces either a signal leading the local oscillating signal by a phase angle of 90° or a signal lagging the local oscillating signal by a phase difference of 90° in synchronism with a field frequency of the frequency-lowered conversion chrominance signal. Also included in the cancelling circuit is a second multiplier for multiplying the output of the delay device by the output of the phase-shifting circuit, the output of which is fed to an operation circuit for effecting addition or subtraction between the output of the first multiplier and the output of the second multiplier to output the result as a carrier chrominance signal.

2 Claims, 2 Drawing Sheets

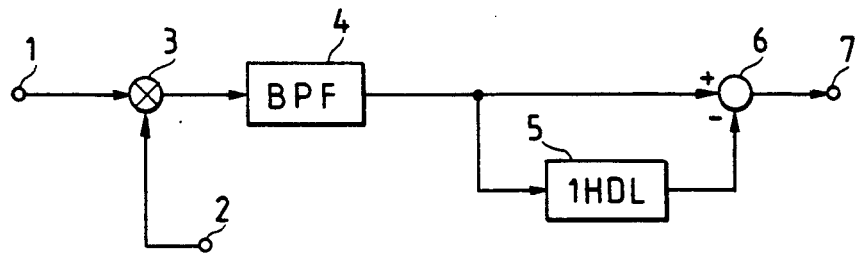
FIG. 1 PRIOR ART
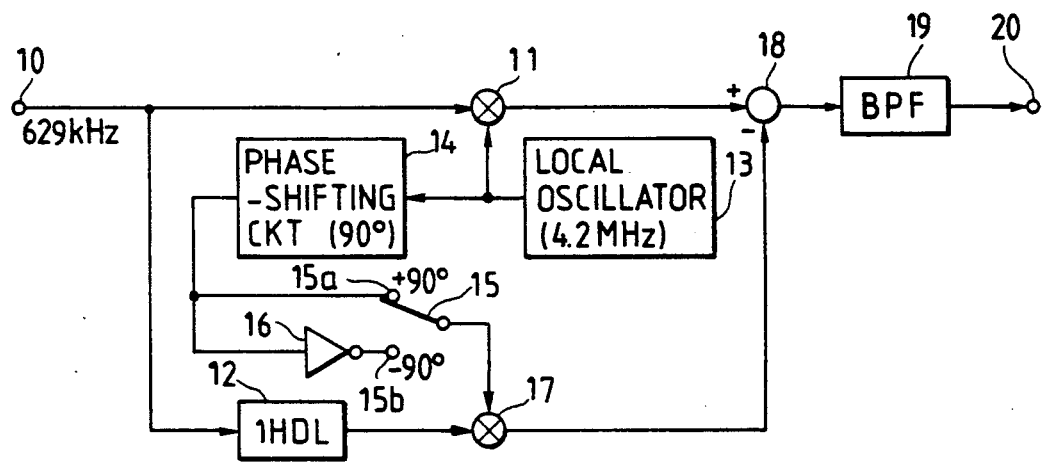
FIG. 2
FIG. 3A
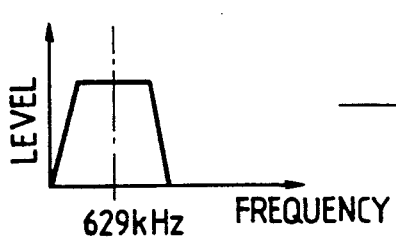
FIG. 3B
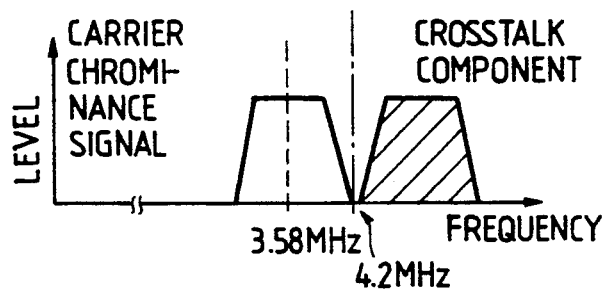

CROSSTALK CANCELLING CIRCUIT FOR REMOVING CROSSTALK COMPONENT FROM REPRODUCED SIGNAL

BACKGROUND OF THE INVENTION

The present invention relates to a crosstalk cancelling circuit for removing a crosstalk component introduced into a reproduced signal of a video tape recorder (VTR).

In VTRs, to remove a crosstalk component due to the adjacent track, a crosstalk cancelling circuit based upon the so-called PS (Phase Shift) system is known, an example of which is illustrated in FIG. 1. In FIG. 1, to an input terminal 1 is supplied a frequency-lowered conversion chrominance signal (frequency down-converted chrominance signal) of 629 KHz ($=40f_H$:$f_H$ represents a horizontal synchronizing frequency) reproduced from a magnetic tape. To an input terminal 2 is fed a local oscillating signal of 4.2 MHz generated by a local oscillator. In order to perform the crosstalk cancellation in accordance with the PS system, the phase of the frequency-lowered conversion chrominance signal is rotated by ±90° at every 1H (1H is one horizontal scanning period on the occasion of recording). The rotating direction differs at every adjacent track, and if the rotating direction is positive with respect to one track, the rotating direction is changed to be negative with respect to the tracks adjacent thereto. The phase of the local oscillating signal supplied to the terminal 2 is rotated by ±90° at every 1H in the same directions as the phase rotation directions of the recording frequency-lowered conversion chrominance signal.

The aforementioned two signals are inputted into a multiplier 3 for multiplication which in turn causes frequency conversion. Thereafter, a band-pass filter (BPF) 4 produces a signal whose central frequency is 3.58 MHz (4.2 MHz−629 KHz). The output of the BPF 4 is directly inputted into a subtracter 6 and further supplied thereto after passed through a 1H delay device (1HDL) 5. In the subtracter 6, the crosstalk component is cancelled by subtraction between the inputted two signals and a signal resulting from the subtraction is outputted as a carrier chrominance signal.

The conventional circuit of FIG. 1 is arranged such that the frequency-lowered conversion chrominance signal (629 KHz) is frequency-converted so as to have a frequency of 3.58 MHz before cancelling the crosstalk. Thus, when a glass delay device is used as the 1HDL 5, difficulty is encountered in machining to obtain high accuracy due to the frequency being high. Further, in the case of use of a charge coupled device (CCD), since the passing band is high, a number of steps are required (generally, 680 steps or 910 steps), resulting in disadvantage in cost.

SUMMARY OF THE INVENTION

It is therefore an object of the present invention to provide a crosstalk cancelling circuit which is capable of size-reduction and cost-reduction.

In accordance with the present invention, a crosstalk cancelling circuit is provided which comprises a first multiplying means for multiplying a frequency-lowered conversion chrominance signal reproduced from a magnetic tape by a local oscillating signal with a predetermined frequency. A delay means is provided for delaying the frequency-lowered conversion chrominance signal by one horizontal scanning period. A phase-shifting circuit performs a switching operation to alternately output a signal leading the local oscillating signal by a phase angle of 90° and a signal lagging the local oscillating signal by a phase difference of 90° in synchronism with a field frequency of the frequency-lowered conversion chrominance signal. The crosstalk cancelling circuit further includes a second multiplying means for multiplying the output of the delay means by the output of the phase-shifting means and operation means for effecting addition or subtraction between the output of the first multiplying means and the output of the second multiplying means, to output the result as a carrier chrominance signal.

In accordance with another aspect of the present invention, there is further provided a crosstalk cancelling circuit which comprises first multiplying means for multiplying a frequency-lowered conversion chrominance signal reproduced from a magnetic tape by a local oscillating signal with a predetermined frequency, delay means for delaying the frequency-lowered conversion chrominance signal by two horizontal scanning periods, phase-control means for effecting a switching operation between the local oscillating signal and a phase-reversed signal of the local oscillating signal. The crosstalk cancelling circuit also includes second multiplying means for multiplying the output of the delay means by the output of the phase-control means, and adding means for effecting addition of the output of the first multiplying means and the output of the second multiplying means to output the result as a carrier chrominance signal.

BRIEF DESCRIPTION OF THE DRAWINGS

The present invention will be described in further detail with reference to the accompanying drawings, in which:

FIG. 1 is a block diagram showing a conventional crosstalk cancelling circuit;

FIG. 2 is a block diagram showing an embodiment of a crosstalk cancelling circuit according to the present invention;

FIGS. 3A and 3B are illustrations of the bands of a frequency-lowered conversion chrominance signal, a carrier chrominance signal and a crosstalk component;

DETAILED DESCRIPTION OF THE INVENTION

Figure 4:
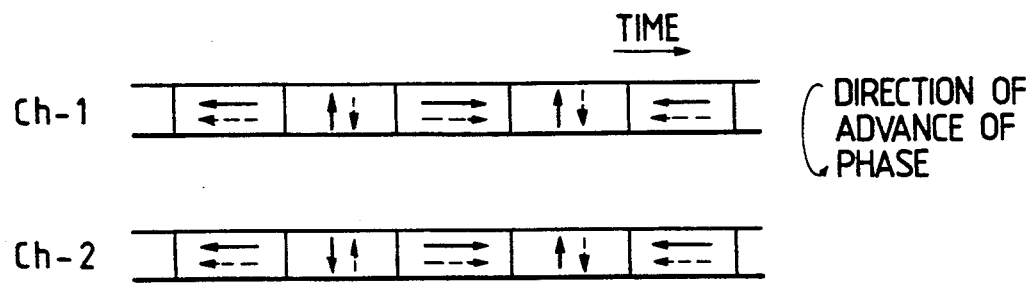
FIG. 4 illustrates the states of signals recorded in two channels on a magentic tape.

FIG. 2 is a block diagram showing an embodiment of a crosstalk cancelling circuit according to the present invention. In FIG. 2, to an input terminal 10 is supplied a frequency-lowered conversion chrominance signal of 629 KHz which is reproduced from a magnetic tape, the conversion chrominance signal having a frequency band as shown in FIG. 3A. This chrominance signal is inputted into a multiplier 11 and further supplied to a 1H delay device (1HDL) 12 which is made up of a charge coupled device (CCD), for example. Since the band of the frequency-lowered conversion signal is low as shown in FIG. 3A, the 1H delay device is disposed at this position, thereby allowing reduction of the number of steps of the CCDs.

Further supplied to the multiplier 11 is a local oscillating signal of 4.2 MHz which is generated by a local oscillator 13, where the local oscillating signal is multiplied by the frequency-lowered conversion chrominance signal so as to result in frequency conversion. The local oscillating signal is arranged in a phase shifting circuit 14 so as to be led by a phase angle of 90° and then supplied to one terminal 15a of a switching means 15 and further supplied to an inverter 16 where the phase is reversed (changed by 180°), the output of the inverter 16 being supplied to the other terminal 15b of the switching means 15. Thus, at the terminal 15a is developed the (+90°) local oscillating signal whose phase is led by 90°, and at the terminal 15b is developed the (−90°) local oscillating signal whose phase is lagged by 90°.

The switching means 15 is switchable in synchronism with one field period of the frequency-lowered conversion chrominance signal by means of a D-type flip-flop (not shown), for example, so as to output one of the signals developed at the terminals 15a and 15b. Accordingly, a multiplier 17 coupled to the switching means 15 receives one of the +90° and −90° local oscillating signals, which are switched at every one field, and further receives the output of the 1H delay device 12. The outputs of the multipliers 11, 17 are inputted into a subtracter 18 for subtraction. The difference signal passes through a band-pass filter 19 whose central frequency is 3.58 MHz and is then taken out from an output terminal 20 as a crosstalk-eliminated carrier chrominance signal.

The elimination of crosstalk by the FIG. 2 circuit will hereinbelow be shown in accordance with detailed calculations. As described above, a frequency-lowered conversion chrominance signal recorded in accordance with the PS system is arranged such that its phase is rotated by ±90° at every 1H and the rotating direction differs at every adjacent track. That is, in FIG. 4, when in a track of a channel 1 (ch-1) the recording is performed such that the phase is rotated by −90° at every 1H, in a track of the adjacent channel ch-2 the phase is rotated by +90° in the opposite direction at every 1H. In FIG. 4, arrows indicated by dotted lines show phases of the crosstalk components from the adjacent channels. When the frequency-lowered conversion chrominance signal reproduced from a magnetic tape is taken to be $\cos\omega_s t$ and the 4.2 MHz local oscillating signal is taken as $\cos\omega_c t$, the multiplication result of the multiplier 11 is expressed as follows:

$$\cos\omega_s t \cdot \cos\omega_c t \qquad (1)$$

Moreover, the frequency-lowered conversion chrominance signal which is reproduced from the ch-1, after passing through the 1H delay device 12, results in a signal obtained by inversion of the signal whose phase is led by 90° relative to the input signal $\cos\omega_s t$ of the 1H delay device 2 due to the above-mentioned phase rotation process at the time of recording and the nature of the chrominance signal in the NTSC system, i.e., $-\cos(\omega_s t + 90°) = \sin(\omega_s t - 90°)$.

At this time, the switching means 15 is operated so as to be coupled to the terminal 15a, and the local oscillating signal from the switching means 15 results in $\cos(\omega_c t + 90°) = -\sin\omega_c t$. Thus, the signal component outputted from the multiplier 17 is expressed as follows:

$$-\sin\omega_s t \cdot \sin\omega_c t \qquad (2)$$

On the other hand, since the phase rotating direction of the crosstalk component (which is defined as $\cos\omega'_s t$) introduced from the ch-2 into the signal of the ch-1 is reverse (positive direction), the crosstalk component in the output of the 1H delay device 12 is expressed as $\cos(\omega'_s t + 90°)$. Hence, the crosstalk component in the output signal of the multiplier 17 results in:

$$\cos(\omega'_s t + 90°) \cdot \cos(\omega_c t + 90°) = +\sin\omega'_s t \cdot \sin\omega_c t \qquad (3)$$

Accordingly, the signal component in the output of the subtracter 18 is expressed as subtraction of the formula (2) from the formula (1), that is, $$\cos\omega_s t \cdot \cos\omega_c t + \sin\omega_s t \cdot \sin\omega_c t = \cos(\omega_c - \omega_s)t \qquad (4)$$

Further, the crosstalk component is expressed as subtraction of the formula (3) from the formula (1), that is, $$\cos\omega'_s t \cdot \cos\omega_c t - \sin\omega'_s t \cdot \sin\omega_c t = \cos(\omega_c + \omega'_s)t \qquad (5)$$

The bands of the signal component of the formula (4) and the crosstalk component of the formula (5) are illustrated in FIG. 3B where they are separated on opposite sides of 4.2 MHz ($=\omega c/2\pi$). Thus, when these signals pass through a band-pass filter 19 whose central frequency is 3.58 MHz, only the crosstalk component is eliminated, and only the carrier chrominance signal is taken out from the output terminal 20.

Secondly, consideration will be made in terms of the ch-2. When the frequency-lowered conversion chrominance signal reproduced from the ch-2 passes through the 1H delay device 12, its phase is led by 90° relative to the input signal $\cos\omega_s t$ thereto due to the aforementioned phase rotation of the recorded chrominance signal and the nature of the chrominance signal in the NTSC system so as to be $\cos(\omega_s t + 90°)$. At this time, the switching means 15 is switched to be coupled to the terminal 15b whereby the local oscillating signal from the switch 15 results in $\cos(\omega_c t - 90°)$. Accordingly, the signal component outputted from the multiplier 17 is expressed as follows:

$$\cos(\omega_s t + 90°) \cdot \cos(\omega_c t - 90°) = -\sin\omega_s t \cdot \sin\omega_c t \qquad (6)$$

On the other hand, the crosstalk component from the ch-1 is opposite in the phase rotating direction (negative direction) and is expressed as $\cos(\omega'_s t - 90°)$, and the crosstalk component in the output signal of the multiplier 17 results in:

$$\cos(\omega'_s t - 90°) \cdot \cos(\omega_c t - 90°) = +\sin\omega'_s t \cdot \sin\omega_c t \qquad (7)$$

Accordingly, the signal component of the output of the subtracter 18 is expressed by subtraction of the formula (6) from the formula (1), that is, $$\cos\omega_s t \cdot \cos\omega_c t + \sin\omega_s t \cdot \sin\omega_c t = \cos(\omega_c - \omega_s)t \qquad (8)$$

and, the crosstalk component is expressed by subtraction of the formula (7) from the formula (1), that is, $$\cos\omega'_s t \cdot \cos\omega_c t - \sin\omega'_s t \cdot \sin\omega_c t = \cos(\omega_c + \omega'_s)t \qquad (9)$$

Thus, as well as the bands of the formulae (4) and (5), the bands of the formulae (8) and (9) are as shown in FIG. 3B, thereby allowing elimination of only the crosstalk component by the BPF 19. Here, the same result can be obtained by using an adder instead of the subtracter 18 under the conditions that the switching means 15 is operated to be coupled to the terminal 15b during the ch-1 reproduction and to be connected to the terminal 15a during the ch-2 reproduction.

Figure 5A:
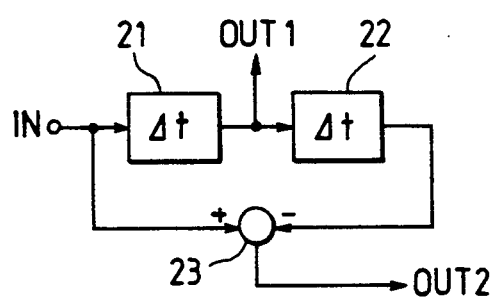
FIGS. 5A and 5B show examples of a phase-shifting circuit used in the FIG. 2 circuit.
Figure 5B:
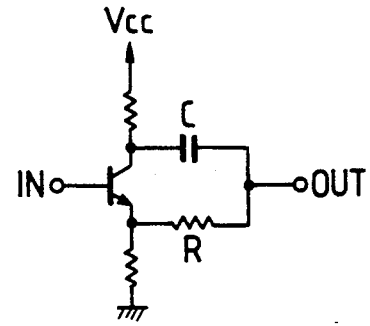

FIGS. 5A and 5B show examples of circuits used as the phase-shifting circuit 14. Of these drawings, FIG. 5A illustrates a known circuit arrangement which performs the Hilbert transform and which comprises delay devices 21 and 22 each for effecting a time delay by $\Delta t$ and a subtracter 23. Here, $\Delta t$ will be set to be about 60 nanoseconds. When using this circuit for the phase shifting circuit 14, the output (OUT1) of the delay device 21 is used as the local oscillating signal for the multiplier 11, and the output (OUT2) of the subtracter 23 is supplied to the switching means 15 and the inverter 16. Letting $\omega$ be the angular frequency of the signal inputted into the FIG. 5A, the transfer function between IN and OUT2 of this circuit is expressed as follows:

$$1 - e^{2j\omega\Delta t} = e^{-\omega\Delta t}(e^{j\omega\Delta t} - e^{j\omega\Delta t}) = 2e^{-j\omega\Delta t} \cdot j\sin\omega\Delta t \quad (10)$$

Since the transfer function between IN and OUT1 is $e^{-j\omega\Delta t}$, the ratio of OUT2 to OUT1 becomes $2j\sin\omega\Delta t$, which is a pure imaginary number. Hence the phase of OUT2 is led by 90° relative to OUT1.

The transfer function of the circuit shown in FIG. 5B is known to be approximately expressed as follows:

$$(1 - j\omega CR)/(1 + j\omega CR) \quad (11)$$

This output lags the input by a phase difference of $2\tan^{-1}\omega CR$. Thus, when $\omega CR = 1$, $\tan^{-1}\omega CR = 45°$. Therefore, if the phase of the output of this circuit is further reverse, it is possible to use it as the phase-shifting circuit 14 in FIG. 2.

According to this embodiment, since as described above the frequency-lowered conversion chrominance signal reproduced from a magnetic tape is delayed by one horizontal scanning period by means of the delay means before the frequency conversion, the band of the signal to be delayed becomes low. In the case where CCDs are used as the delay means, the necessary step number is small, and the whole circuit including the CCDs can be constructed as an integrated circuit, thereby easily allowing size-reduction and cost-reduction.

Figure 6:
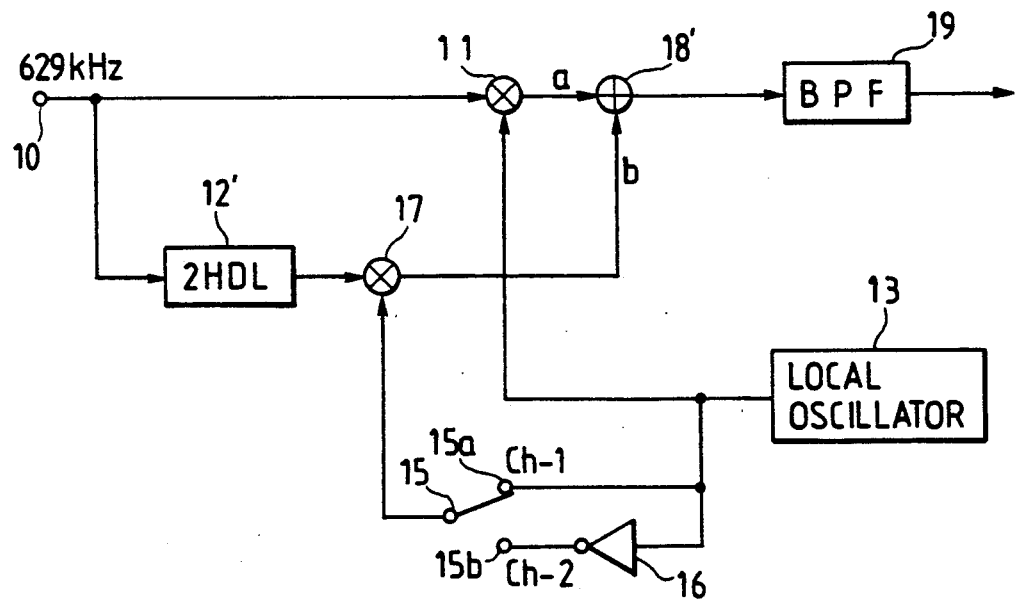
FIG. 6 is a block diagram illustrating a further embodiment of a crosstalk cancelling circuit according to the present invention.

FIG. 6 shows a circuit arrangement of a crosstalk cancelling circuit according to a second embodiment of this invention. This crosstalk cancelling circuit is constructed in accordance with the PAL system, where a frequency-lowered conversion chrominance signal is recorded such that in tracks of ch-1 its phase is not rotated, and in tracks of ch-2 the phase is rotated by 90° in a predetermined direction at every 1H. Parts corresponding to those in FIG. 2 are marked with the same numerals; the description thereof will be omitted for brevity. In FIG. 6, a frequency-lowered conversion chrominance signal is supplied through an input terminal 10 to a multiplier 11. Further, a local oscillating signal generated by a local oscillator 13 is supplied to the multiplier 11. The multiplier 11 effects multiplication of the frequency-lowered conversion chrominance signal and the local oscillating signal so as to produce a frequency-converted signal a. The frequency-lowered conversion chrominance signal is further supplied to a 2H delay device (2HDL) 12', the output of which is fed to another multiplier 17. The multiplier 17 further receives the local oscillating signal of the local oscillator 13 through a switching means 15 which includes terminals 15a and 15b. The terminal 15a is directly coupled to the local oscillator 13, and the terminal 15b is coupled through an inverter 16 thereto. That is, the switching means 15 is operated such that the terminal 15a is coupled to the multiplier 17 during the ch-1 reproduction, and the terminal 15b is coupled thereto during the ch-2 reproduction. As a result, the output signal b of the multiplier 17 is in phase with respect to the output signal a of the multiplier 11. The signals a and b are added to each other in an adder 18', the output of which is fed to a band-pass filter BPF) 19.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A crosstalk cancelling circuit comprising:
   first multiplying means for multiplying a frequency-lowered conversion chrominance signal reproduced from a magnetic tape by a local oscillating signal;
   delay means for delaying said frequency-lowered conversion chrominance signal by one horizontal scanning period;
   circuit means for alternately outputting a signal leading said local oscillating signal by a phase angle of 90° and a signal lagging said local oscillating signal by a phase difference of 90° in synchronism with a field frequency of frequency-lowered conversion chrominance signal;
   second multiplying means multiplying the output of said delay means by the output of said circuit means; and
   operation means for effecting addition or subtraction between the output of said first multiplying means and the output of said second multiplying means to thereby produce a cross-talk eliminated carrier chrominance signal.

2. A crosstalk cancelling circuit comprising:
   first multiplying means for multiplying a frequency-lowered conversion chrominance signal reproduced from a magnetic tape by a local oscillating signal;
   delay means for delaying said frequency-lowered conversion chrominance signal by two horizontal scanning periods;
   circuit means for alternately outputting said local oscillating signal and a phase-reversed signal of said local oscillating signal;
   second multiplying means for multiplying the output of said delay means by the output of said circuit means; and
   adding means for effecting addition of the output of said first multiplying means and the output of said second multiplying means to thereby produce a crosstalk-eliminated carrier chrominance signal.

* * * * *